United States Patent
Mullins et al.

(10) Patent No.: US 11,725,738 B2
(45) Date of Patent: Aug. 15, 2023

(54) VALVE ASSEMBLY METHOD

(71) Applicant: OIL STATES ENERGY SERVICES, L.L.C., Houston, TX (US)

(72) Inventors: Blake Mullins, Edmond, OK (US); Danny L Artherholt, Asher, OK (US); Mickey Claxton, Oklahoma City, OK (US); Bob McGuire, Meridian, OK (US); Charles Beedy, Oklahoma City, OK (US)

(73) Assignee: OIL STATES ENERGY SERVICES, L.L.C., Houston, TX (US)

( * ) Notice: Subject to any disclaimer, the term of this patent is extended or adjusted under 35 U.S.C. 154(b) by 248 days.

(21) Appl. No.: 17/138,238

(22) Filed: Dec. 30, 2020

(65) Prior Publication Data
US 2021/0123533 A1     Apr. 29, 2021

Related U.S. Application Data

(63) Continuation-in-part of application No. 16/663,077, filed on Oct. 24, 2019, now Pat. No. 11,028,929.

(51) Int. Cl.
*F16K 3/20* (2006.01)
*F16K 3/02* (2006.01)

(52) U.S. Cl.
CPC ............. *F16K 3/20* (2013.01); *F16K 3/0272* (2013.01); *F16K 3/0236* (2013.01)

(58) Field of Classification Search
CPC ........ F16K 3/0236; F16K 3/0272; F16K 3/20; F16K 3/207; F16K 5/0636; F16K 5/0626; F16K 5/201; Y10T 137/0514; Y10T 137/0508
See application file for complete search history.

(56) References Cited

U.S. PATENT DOCUMENTS

| | | | | |
|---|---|---|---|---|
| 2,030,458 A | * | 2/1936 | McKellar | F16K 3/207 137/246.22 |
| 3,521,855 A | ‡ | 7/1970 | Jensen | F16K 5/0673 251/17 |
| 3,610,569 A | ‡ | 10/1971 | Reaves | F16K 3/207 251/52 |
| 3,614,061 A | | 10/1971 | Fitzpatrick | |
| 3,749,357 A | * | 7/1973 | Fowler | F16K 5/205 251/315.08 |

(Continued)

FOREIGN PATENT DOCUMENTS

FR          1511626 A  *  2/1968

OTHER PUBLICATIONS

Patent Cooperation Treaty, PCT/US2020/045469, International Search Report and Written Opinion, dated Oct. 21, 2020.‡

(Continued)

*Primary Examiner* — David Colon-Morales
(74) *Attorney, Agent, or Firm* — Morgan, Lewis & Bockius LLP

(57) ABSTRACT

A method for installing a valve for use in oil and gas production or similar applications includes inserting seats and biasing members into a cavity of the valve and causing the seats to moving axially apart from each other, such that the biasing members are compressed and the flow barrier of the valve may be installed between the seats.

9 Claims, 19 Drawing Sheets

(56) References Cited

U.S. PATENT DOCUMENTS

| | | | | |
|---|---|---|---|---|
| 4,020,864 A ‡ | 5/1977 | Church, Jr. | ............ | F16K 5/201 137/24 |
| 4,068,821 A * | 1/1978 | Morrison | ............ | F16K 3/207 251/328 |
| 4,124,194 A ‡ | 11/1978 | Alvarez | ............ | F16K 3/186 251/15 |
| 4,177,833 A ‡ | 12/1979 | Morrison | ............ | F16K 3/0227 137/62 |
| 4,192,483 A * | 3/1980 | Combes | ............ | F16K 3/207 277/910 |
| 4,226,258 A ‡ | 10/1980 | Nakanishi | ............ | F16K 5/14 137/20 |
| 4,513,947 A * | 4/1985 | Amend | ............ | F16K 3/20 251/328 |
| 4,566,482 A * | 1/1986 | Stunkard | ............ | F16K 5/0673 251/315.08 |
| 4,637,421 A * | 1/1987 | Stunkard | ............ | F16K 5/0673 251/315.08 |
| 4,718,444 A * | 1/1988 | Boelte | ............ | F16K 5/0636 251/188 |
| 4,878,651 A ‡ | 11/1989 | Meyer, Jr. | ............ | F16K 3/0236 251/172 |
| 5,163,655 A * | 11/1992 | Chickering, III | ............ | F16K 5/201 251/360 |
| 5,201,872 A ‡ | 4/1993 | Dyer | ............ | F16K 3/0236 251/17 |
| 5,445,359 A ‡ | 8/1995 | Beson | ............ | F16K 3/205 251/159 |
| 5,533,738 A ‡ | 7/1996 | Hoffmann | ............ | F16K 5/201 277/38 |
| 5,624,101 A ‡ | 4/1997 | Beson | ............ | F16K 3/20 251/172 |
| 5,707,042 A ‡ | 1/1998 | Maselli | ............ | F16K 5/0673 251/31 |
| 6,206,023 B1 ‡ | 3/2001 | Landers | ............ | F16K 5/0673 137/15 |
| 6,279,875 B1 ‡ | 8/2001 | Chatufale | ............ | F16K 3/207 251/171 |
| 6,664,572 B2 ‡ | 12/2003 | Chatufale | ............ | F16K 3/0227 251/309 |
| 6,966,537 B2 ‡ | 11/2005 | Sundararajan | ............ | F16K 3/0227 251/172 |
| 8,091,861 B2 ‡ | 1/2012 | Nesje | ............ | F16K 3/0227 251/282 |
| 8,327,866 B2 * | 12/2012 | Parks, Jr. | ............ | F16K 3/0236 251/328 |
| 8,496,226 B2 ‡ | 7/2013 | Dalluge | ............ | F16K 5/0636 251/159 |
| 8,662,473 B2 * | 3/2014 | Comeaux | ............ | F16K 3/20 251/328 |
| 8,733,733 B2 ‡ | 5/2014 | Collison | ............ | F16K 5/0636 251/174 |
| 8,973,897 B2 ‡ | 3/2015 | Cordova | ............ | F16K 3/02 251/327 |
| 9,453,578 B2 ‡ | 9/2016 | Sundararajan | ............ | F16K 3/20 |
| 9,791,048 B2 * | 10/2017 | Jackson | ............ | F16K 5/0636 |
| 9,835,259 B2 * | 12/2017 | Shah | ............ | F16K 5/0636 |
| 9,885,420 B2 * | 2/2018 | Sundararajan | ............ | F16K 3/0218 |
| 9,915,359 B2 ‡ | 3/2018 | Ricard | ............ | F16K 5/0689 |
| 10,422,197 B2 * | 9/2019 | Herland | ............ | F16K 3/02 |
| 11,384,844 B2 * | 7/2022 | Karlsen | ............ | F16K 5/205 |
| 11,384,846 B2 * | 7/2022 | Mandare | ............ | F16K 5/0689 |
| 2003/0070709 A1 | 4/2003 | Mullins | | |
| 2005/0104026 A1 | 5/2005 | Tulaskar | | |
| 2006/0017035 A1 ‡ | 1/2006 | Bearer | ............ | F16K 5/0673 251/17 |
| 2011/0037010 A1 | 2/2011 | Parks, Jr. | | |
| 2016/0186870 A1 ‡ | 6/2016 | Ricard | ............ | F16K 5/205 251/18 |
| 2016/0356384 A1 | 12/2016 | Jackson | | |

OTHER PUBLICATIONS

PCT/US2019/057924; Jan. 6, 2020, International Search Report and Written Opinion.‡

Patent Cooperation Treaty; PCT/US2019/047924; Jan. 6, 2020 International Search Report and Written Opinion.

Patent Cooperation Treaty; PCT/US2020/045469; Oct. 21, 2020 International Search Report and Written Opinion.

Patent Cooperation Treaty; PCT/US20/5071; Dec. 7, 2020 International Search Report and Written Opinion.

Patent Cooperation Treaty; PCT/US2021/012205; Mar. 8, 2021, International Search Report and Written Opinion.

* cited by examiner
‡ imported from a related application

VALVE ASSEMBLY METHOD

FIELD OF THE INVENTION

The invention relates to a method for installing a valve with a biasing member disposed between the seats and the valve body. Although the valve is primarily described in reference to a gate valve, it could be equally applicable to other types of valves, including but not limited to a ball valve or plug valve.

BACKGROUND OF THE INVENTION

Valves generally comprise a valve body with an interior bore for the passage of fluid, and a means of sealing off the interior bore to stop the flow of fluid. Certain types of valves, such as plug valves or ball valves, include a plug or ball that is capable of rotating between an open position, in which fluid is allowed to flow through the interior bore, and a closed position, in which the plug or ball blocks the flow of fluid through the interior bore. Other types of valves, such as gate valves, include a gate that is vertically lowered to block the flow of fluid through the interior bore. All of these types of valves are often used in connection with the production of hydrocarbons such as crude oil or natural gas.

The valve of the present invention will be primarily described in the context of an embodiment using a gate valve, but it could also be used in ball valves, plug valves, or other types of valves. The particular type of valve is not critical to the operation of the invention and the claims of the present application should not be interpreted as limited to any specific type of flow barrier used in the valve. It will be readily apparent to one of ordinary skill in the art how to implement the present invention in a type of valve other than a gate valve.

Gate valves require a sealing interface so that, when in the closed position, the gate will contain the pressure of the fluid within the interior bore of the valve. In many applications, such as the production of hydrocarbons, interior pressures can be extremely high, on the order of 15,000 pounds per square inch or higher. In addition, the fluid within the interior bore may be corrosive or otherwise potentially damaging to the seals. Accordingly, the integrity and reliability of the sealing interface is of utmost importance in the design of such a valve.

Most existing valves create a sealing interface through the use of annular seats adjacent to both the valve body and the gate or other flow barrier. Each seat will generally comprise a radial face that contacts and seals against the flow barrier. Many valves rely, at least in part, on pressure from fluid flowing through the interior bore to create and maintain this seal between the seats and the flow barrier. However, such a design suffers from several drawbacks.

First, these existing valve designs traditionally seal only on one side of the valve, generally the downstream side, when considering the typical direction of the fluid flow through the valve. This design is prone to failure from contamination of the sealing surfaces because the sealing surfaces are only engaged when the valve is closed. When the valve is open, there is a gap between the sealing surfaces. The lack of constant engagement allows chemicals and/or particulates in the fluid stream to degrade the sealing surfaces to the point that they no longer effectuate a seal. For example, sand or other particulate matter may cause abrasion of the sealing surface, particularly if the seal is formed from an elastomeric material. Separate from the risk of abrasion, particulate matter such as sand may remain in the gap between sealing surfaces when an operator is attempting to open or close the valve and may physically interfere with the formation of a solid seal and/or may increase the difficulty of rotating or sliding the valve to or from an open or closed position.

The gap between sealing surfaces in a typical plug valve is also problematic because valves generally require grease to function; without grease or some other lubricant in the valve body, the plug or ball cannot rotate to a closed position. A gap between sealing surfaces typically allows grease to move from the interior of the valve body to the fluid stream. This migration of grease creates a loss of lubrication which can result in the plug being unable to rotate to the open (or closed) position.

Second, under certain operating conditions, the pressure of fluid flowing through the interior bore might not be sufficient to create a reliable seal between the seats and the flow barrier. In particular, the typical valve design can be prone to leaking at low pressures because the design is meant to be at a high pressure to engage the sealing surfaces when the valve is closed. At low pressures, the aforementioned problem with grease loss can also exacerbate the problem with leaking, as grease often serves as the low pressure seal in existing valve designs.

One potential way to address the problems with standard existing valve designs is to include a biasing member, such as a spring, to provide additional force urging the seats into contact with the flow barrier, beyond the force exerted by the fluid flowing through the interior bore. For example, such a design is shown in commonly owned and co-pending application Ser. Nos. 16/663,077 and 16/736,362. These valve designs, however, can be very difficult to assemble.

A typical gate valve is assembled by placing the two annular seat assemblies in position within the cavity of the valve body and then inserting the gate down through the cavity so that it slides between the seats. However, if there are biasing members between the seats and the valve body, this assembly method is not possible because the axial force exerted by the biasing members will cause the seats to move towards each other. This axial movement prevents the gate from being slid down through the cavity because there is simply not enough space between the seats to accommodate the width of the gate.

A valve with biasing members may also be assembled by using a removable bore end connection, rather than a single unitary valve body. Such a design is shown in commonly owned and co-pending application Ser. No. 16/988,283.

The present invention addresses the unmet need for a valve that can seal on both sides of the flow barrier and seal under low pressure conditions, while still being easily assembled.

SUMMARY OF THE INVENTION

An aspect of the present invention is to create a valve with a biasing member that urges the seats towards sealing engagement with the flow barrier, as well as methods for assembling such a valve.

Consistent with existing valve designs, each seat is generally annular in shape with two radial surfaces, one of which is configured to abut the flow barrier for the purpose of forming a seal. As noted above, when the valve is open and pressurized fluid is flowing through the internal bore, pressure on the radial surface distal from the flow barrier (also referred to as the "upstream" surface) will tend to urge the other ("downstream") radial surface into engagement with the flow barrier. Unlike existing valve designs, however, the present invention does not rely solely on such fluid pressure to create and maintain a seal between the seats and the flow barrier.

In an exemplary embodiment, each seat is disposed between the flow barrier and the valve body, with a spring or other biasing member engaging both the seat and the valve body. Each spring thus tends to exert a force on one of the seats in the direction of the flow barrier. This force assists in creating and/or maintaining a seal between the seats and the flow barrier, particularly when fluid pressure within the valve is at lower levels.

The present invention also includes tools and methods of installation for this exemplary embodiment. For example, the valve seats in the exemplary embodiment may be installed using a specialized tool comprising two rods with radially extending arms, each configured to engage the downstream radial surface of one side of a seat. The tool may be used to axially retract both seats, thereby compressing the biasing members and creating sufficient space between the seats for the flow barrier to be installed.

Similarly, the valve seats in the exemplary embodiment may be installed using a specialized tool with a single rod connecting two radially extending arms separated by a fixed distance that is at least as wide as the width of the flow barrier. When this specialized tool is inserted between the seats, they are forced apart, thereby compressing the biasing members and creating sufficient space between the seats for the flow barrier to be installed.

Alternatively, the seats and/or the flow barrier may be configured to facilitate installation of the valve seats in the exemplary embodiment. For example, the lower portion of the flow barrier may comprise a lower axial face with a width less than the distance between the seats when the biasing members have not been compressed. The lower face transitions to a beveled outer surface which becomes steadily wider until it reaches the full width of the flow barrier at a point below the throughbore of the flow barrier.

Similarly, the flow barrier may comprise a separate guide member connected to the lower face of the flow barrier. The guide member may have a substantially trapezoidal cross-section, such that it comprises a lower axial face with a width less than the distance between the seats when the biasing members have not been compressed, transitioning to a beveled outer surface which becomes steadily wider until it reaches a width substantially equal to the full width of the flow barrier at the point where it is connected to the flow barrier.

Alternatively, each seat may include an upper axial face such that the distance between the two seats is greater than the full width of the flow barrier. Each upper axial face transitions to a beveled outer surface which becomes steadily wider until it reaches the full width of the seat at a point above the throughbore.

In another embodiment, the flow barrier may be installed using an outer sleeve and two compression members, each such member comprising a lower flange configured to engage with one of the valve seats, a substantially planar member, and an upper flared portion. The outer sleeve has an outer width greater than the width of the flow barrier and is configured to be inserted along with the flow barrier. When the outer sleeve engages with the compression members, the compression members are forced apart, thereby also forcing apart the seats, compressing the biasing members, and creating sufficient space between the seats for the flow barrier to be installed.

References throughout the description to "upper" or "lower" and "upstream" or "downstream" should not be interpreted as limiting which term could be used to refer to which particular portion of the invention. For example, those of skill in the art will understand that which portion of the valve is upstream or downstream depends on which direction fluid is flowing, and is therefore unrelated to the structure of the device itself.

BRIEF DESCRIPTION OF THE DRAWINGS

Specific embodiments of the invention are described below with reference to the figures accompanying this application. The scope of the invention is not limited to the figures.

DETAILED DESCRIPTION OF THE INVENTION

Figure 1:
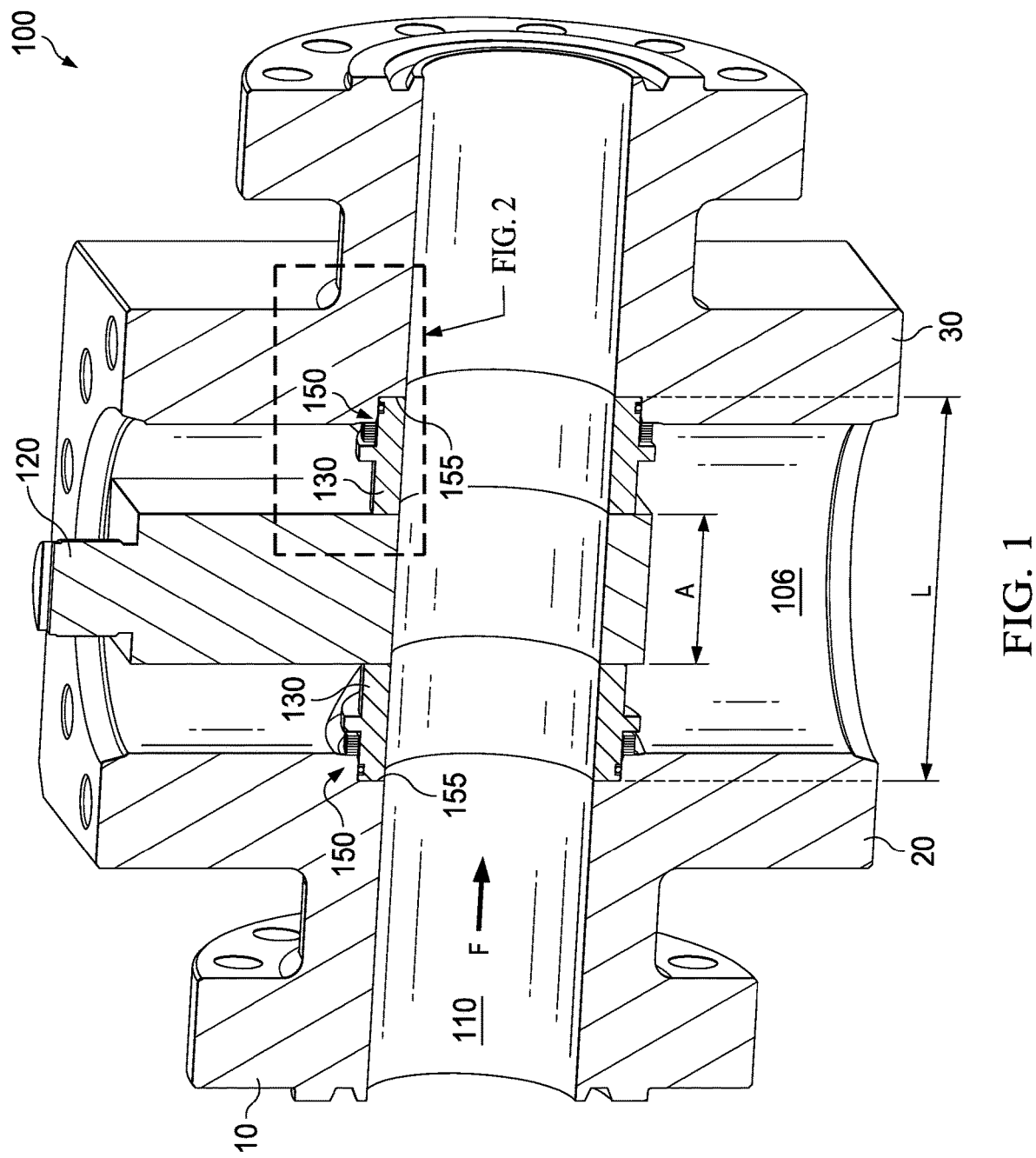
FIG. 1 depicts a perspective view of an embodiment of the valve when the biasing members have been compressed and the flow barrier is installed between the two valve seats.

Referring to FIG. 1, the valve 100 includes a flanged connection to be installed in an oil and gas production area or similar application. The fluid enters into the valve at the upstream flanged connection 10 and is allowed to flow through the valve body 20 and exits the downstream flanged connection 30. Extending between upstream flanged connection 10 and downstream flanged connection 30 is interior bore 110. Fluid may flow through interior bore 110 in the direction indicated by arrow F but, as noted above, fluid may also flow in the opposite direction and the valve will still function as described below.

Within valve body 20 is disposed gate 120, with a width designated as A. Cavity 106 is formed within valve body 20 and gate 120 moves within cavity 106.

Also disposed within valve body 20 are seats 130. Those of ordinary skill in the art will recognize that seats 130 are located on opposite sides of gate 120 and thus are mirror images of each other, but are otherwise generally identical.

Figure 2:
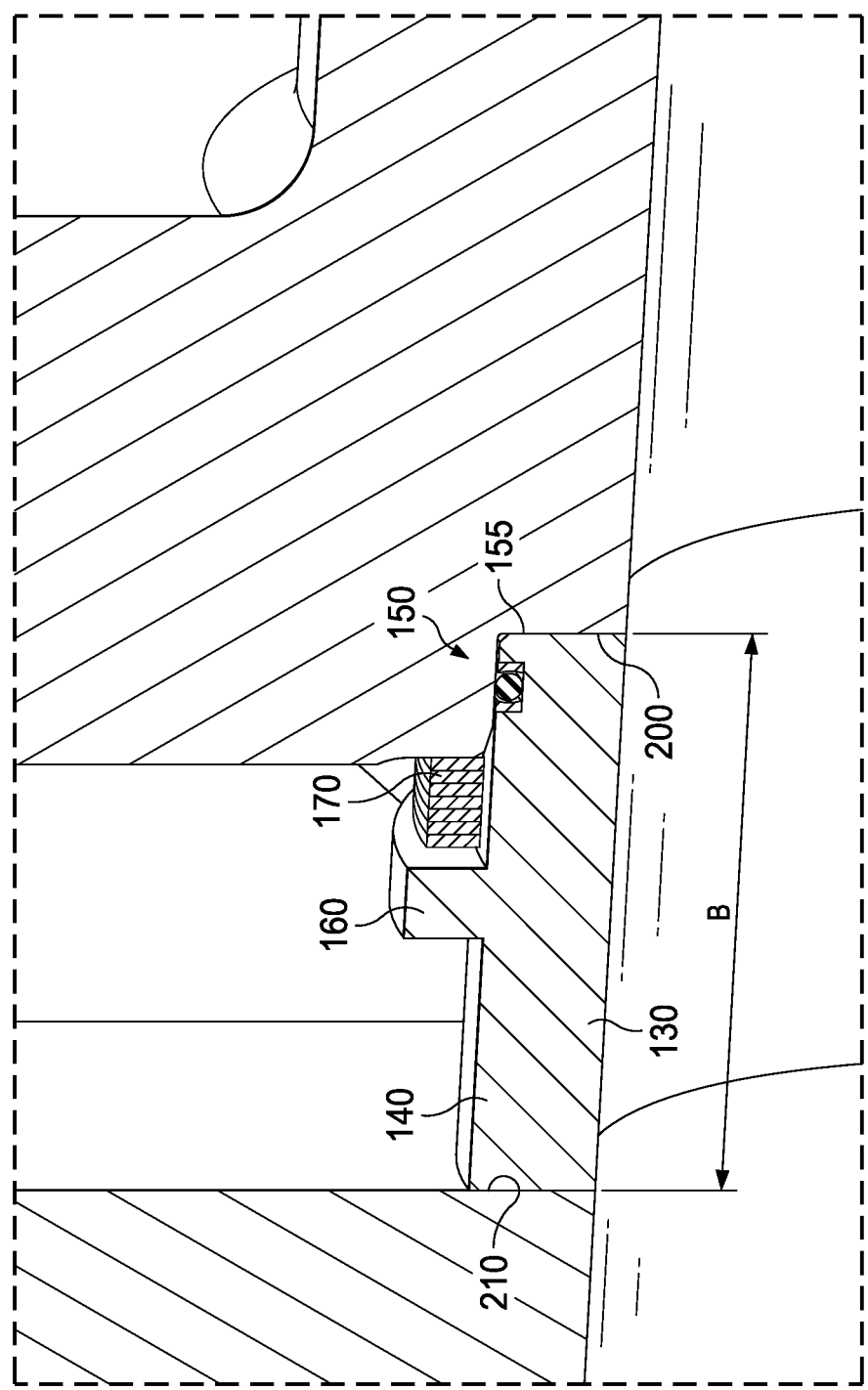
FIG. 2 depicts a close up view of one of the valve seats in the embodiment shown in FIG. 1.

Seats 130 are generally annular in shape and may be formed of metal, such as stainless steel. Seats 130 have a width designated as B. As shown in FIG. 2, seats 130 are configured to be slidably disposed within recesses 150 formed in valve body 20. Recesses 150 each have a radial surface 155, which is distal from gate 120. As shown in FIG. 1, the distance across cavity 106 between one radial surface 155 and the other is designated as L.

The downstream side of seat 130 comprises radial surface 200 adjacent to valve body 20, as shown in FIG. 2. The upstream side of seat 130 comprises radial surface 210, which is adjacent to gate 120 after the valve has been assembled. Upper axial surface 140 extends between radial surfaces 200 and 210.

Seat 130 also comprises support 160 extending in a generally radial direction from upper axial surface 140, with biasing member 170 extending axially between support 160 and valve body 20. Biasing member 170 may be a spring, a Belleville washer, or any other suitable device that is biased to exert axial pressure on support 160 in the direction of gate 120. Support 160 may be a post, arm, spoke, or any radially extending structure configured to transmit the axial force exerted by biasing member 170. Support 160 may either be formed integrally with seat 130 or formed as a separate component that is attached to seat 130. In either event, the axial force exerted by biasing member 170 assists in maintaining a seal between seat 130 and gate 120, particularly under low-pressure operating conditions.

Figure 3:
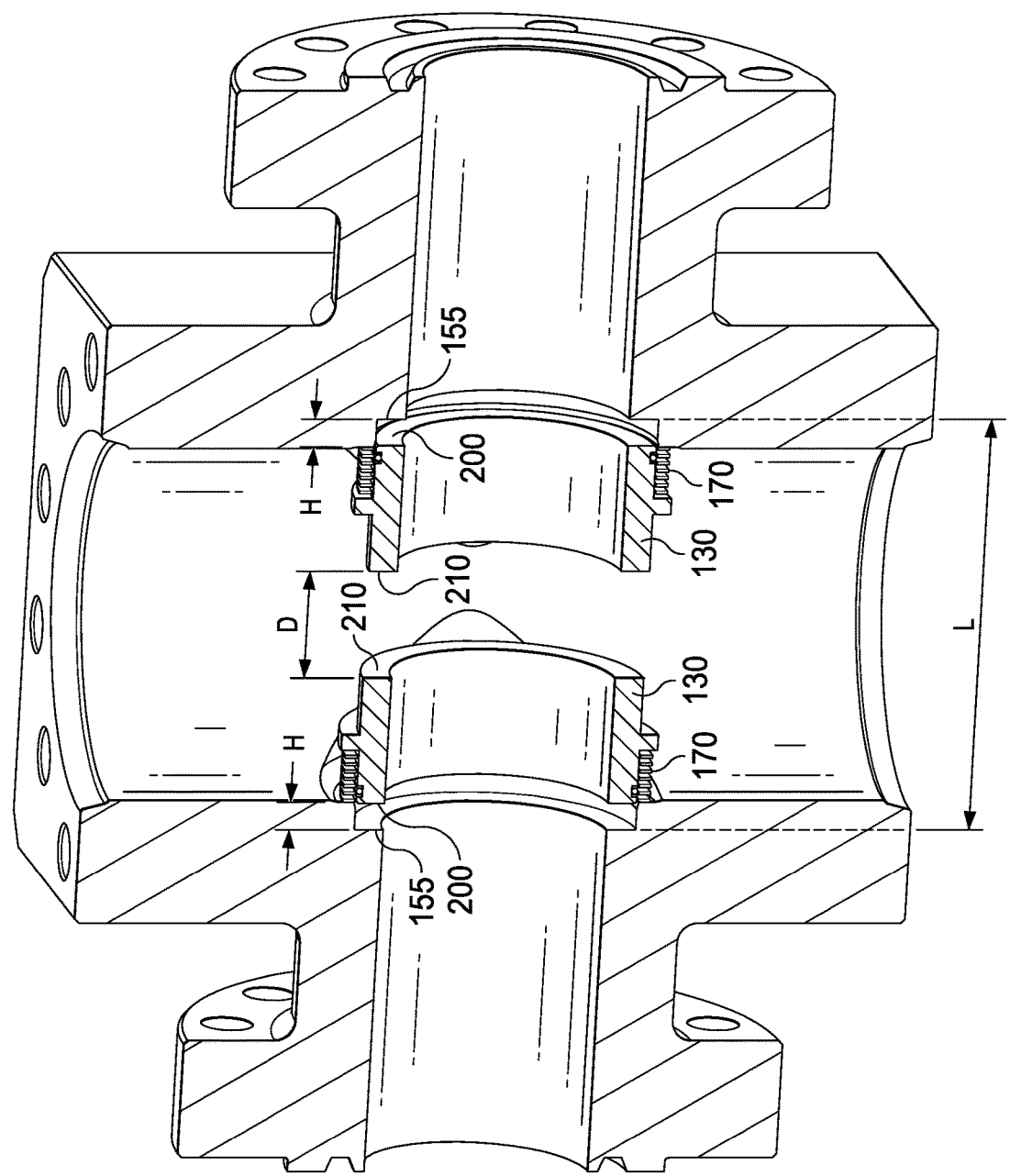
FIG. 3 depicts a perspective view of the embodiment shown in FIG. 1 before the biasing members have been compressed and the flow barrier installed.

As shown in FIG. 3, when biasing members 170 are not compressed, they will create a gap of width H between radial surface 155 of recess 150 and radial surface 200 of seat 130. Accordingly, radial surface 210 of both seats 130 will extend into cavity 106 by the width of B+H. This configuration leaves the axial distance D between radial surfaces 210 of seats 130, where D=L−2(B+H). Accordingly, in the position shown in FIG. 3, gate 120 may not be inserted between seats 130 because width A is greater than distance D (A>D).

For gate 120 to be installed in the valve, it is necessary that seats 130 be axially displaced farther into recesses 150. In this configuration, radial surfaces 210 of both seats 130 are spaced away from radial surfaces 155 of recesses 150 by the comparatively smaller distance of B. Thus, the distance D' between seats 130 is now D'=L−2B. This additional axial displacement is sufficient to permit gate 120 to be inserted between seats 130 (A≤D'). Accordingly, one goal of the present invention is to ensure that seats 130 remain fully axially displaced into recesses 150 during the process of installing gate 120.

Figure 4A:
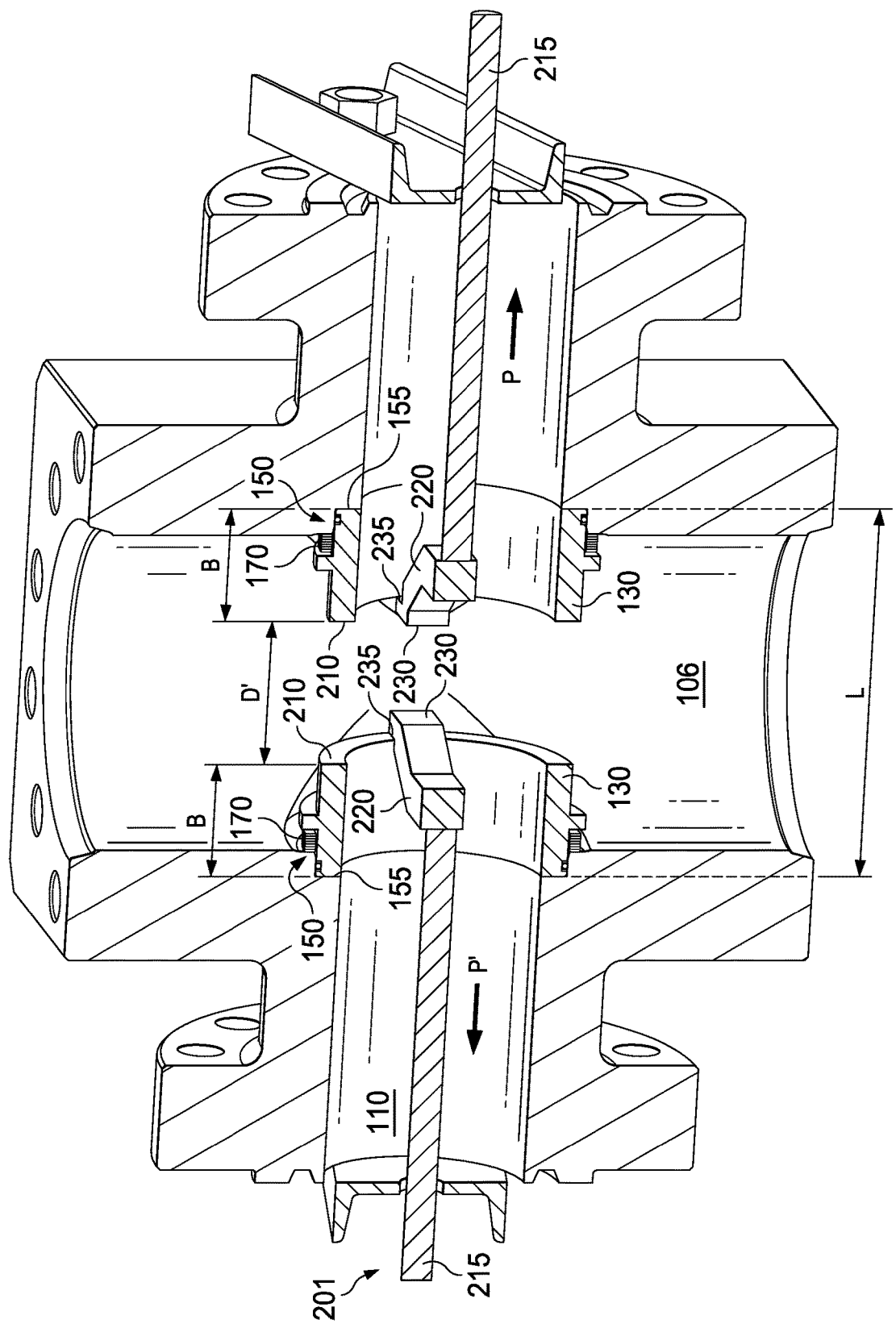
FIG. 4A depicts a perspective view of the embodiment shown in FIG. 1 with an embodiment of an installation tool being used to compress the biasing members.

FIG. 4A depicts one embodiment of an installation tool 201 that can be used for installation of a valve such as that shown in FIGS. 1-3. Installation tool 201 may comprise two rods 215, each comprising a radially extending arm 220. Arms 220 may either be formed integrally with rods 215 or formed as separate component that are attached to rods 215. Rods 215 may be virtually any size and shape, provided they are able to be inserted into throughbore 110 and are long enough that arms 220 are able to engage with radial surfaces 210 of seats 130. For this purpose, arms 220 may comprise radially extending shoulder 230 with a surface 235 configured to provide flush engagement with surfaces 210 of seats 130.

Figure 5A:
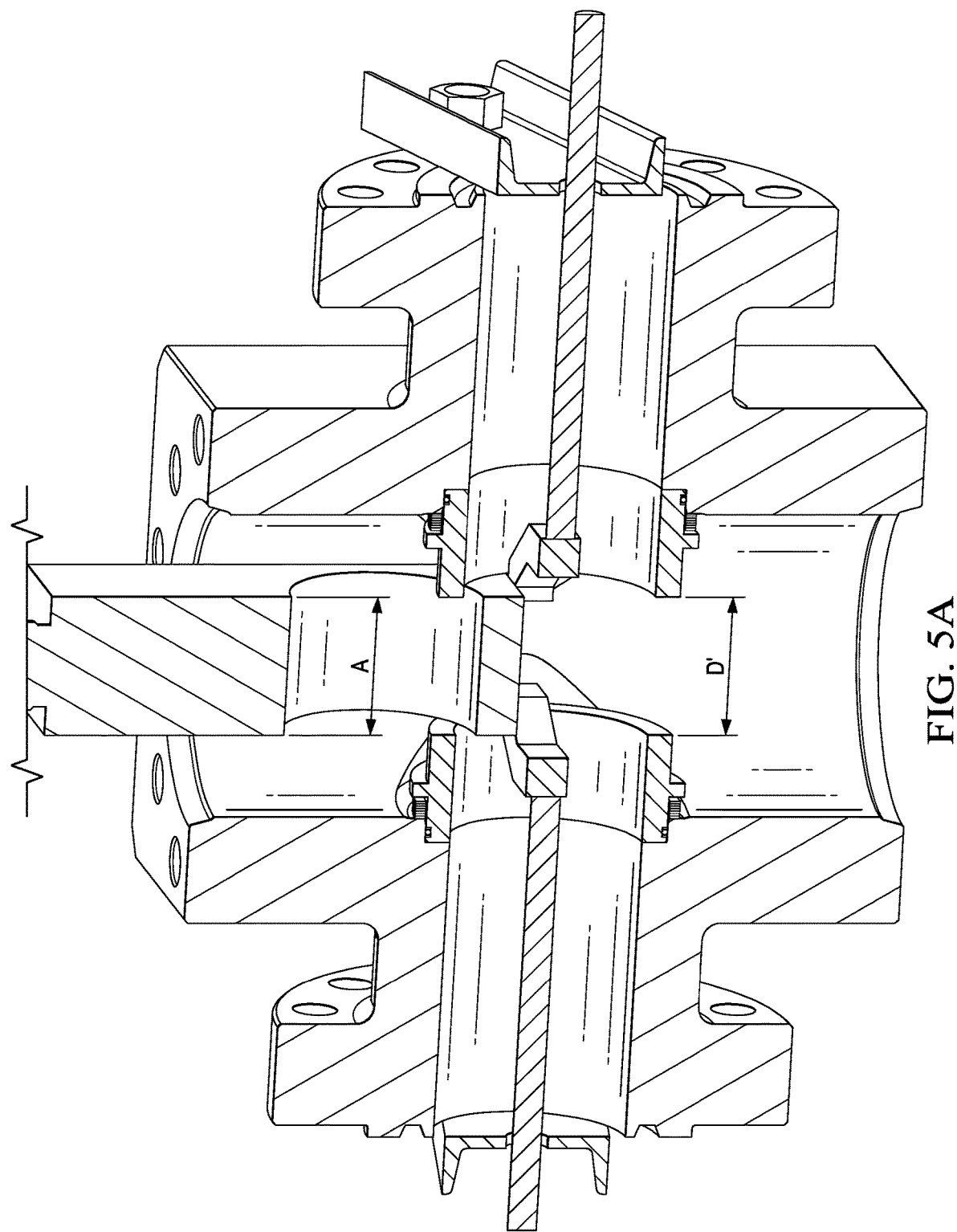
FIG. 5A depicts the same view as FIG. 4A, with the flow barrier partially inserted between the valve seats.

Once arms 220 have engaged seats 130, axial forces may be applied to rods 215 in opposite directions, as shown by arrows P and P' in FIG. 4A. Forces P and P' will cause seats 130 to be axially displaced farther into recesses 150, thus compressing biasing members 170. As described above, this additional axial displacement causes creation of the distance D' between seats 130. Because A≤D', gate 120 may be inserted between seats 130, as shown in FIG. 5A.

Figure 4B:
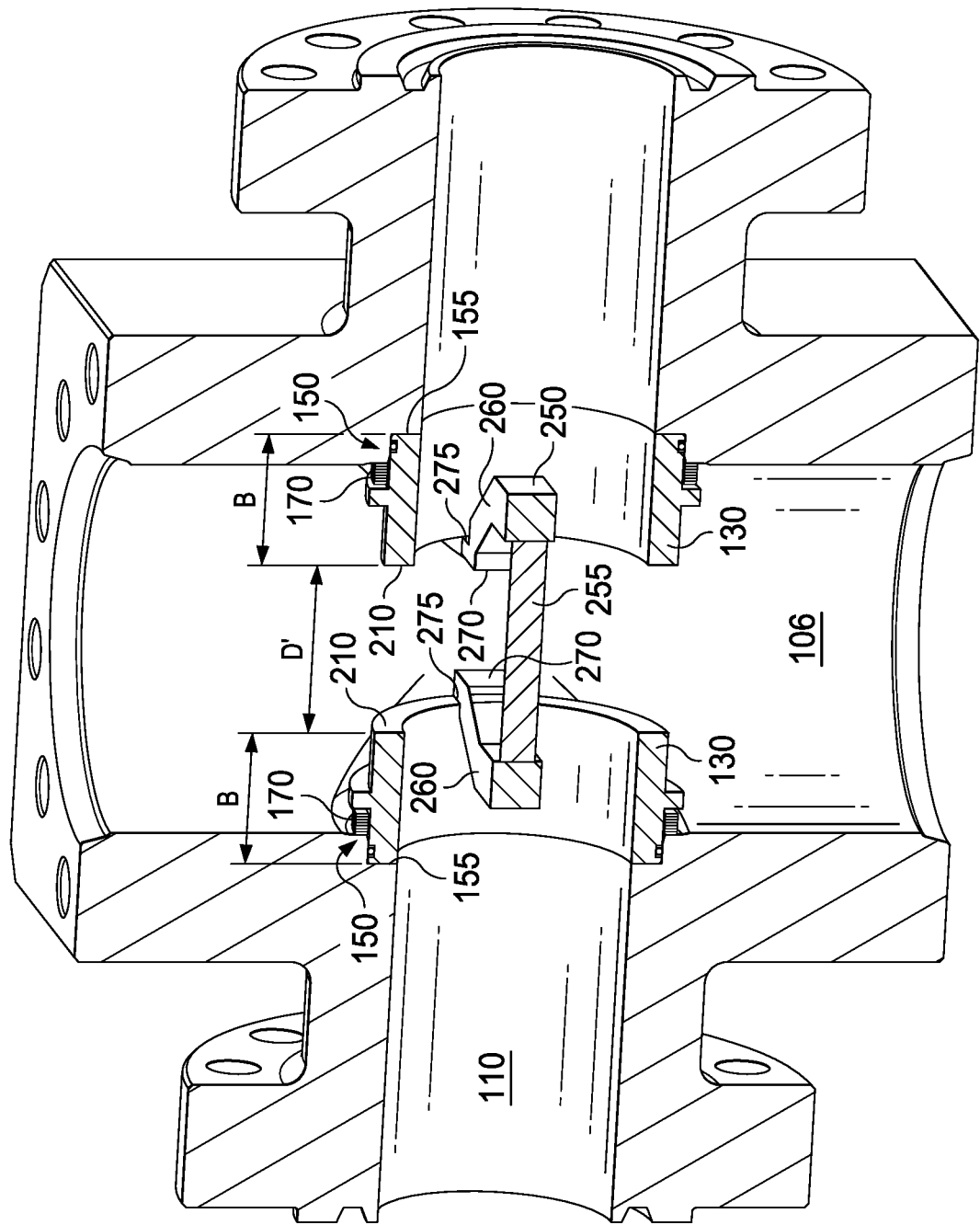
FIG. 4B depicts a perspective view of the embodiment shown in FIG. 1 with an alternate embodiment of an installation tool being used to compress the biasing members.
Figure 5B:
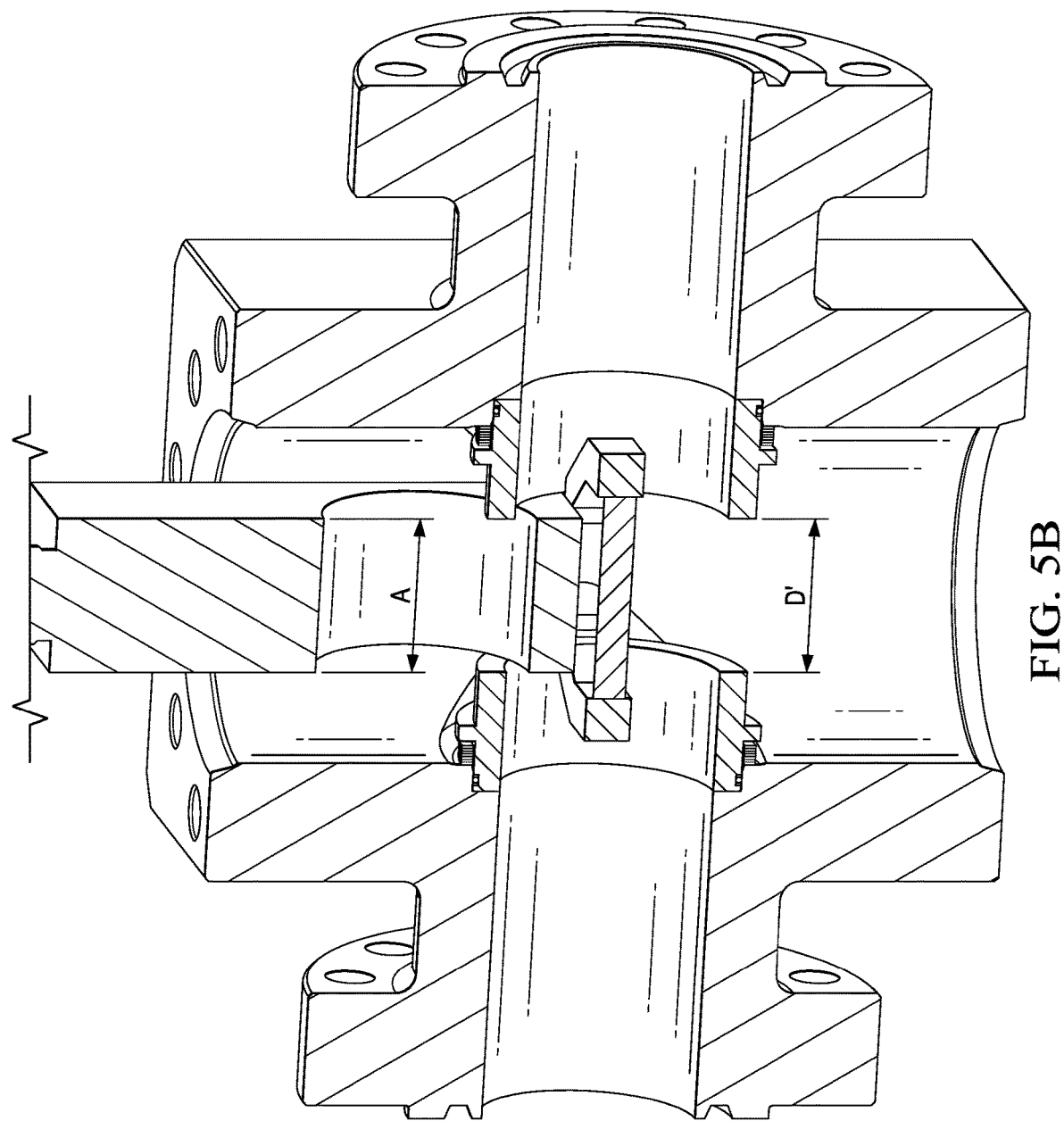
FIG. 5B depicts the same view as FIG. 4B, with the flow barrier partially inserted between the valve seats.

In an alternate embodiment as shown in FIG. 4B, installation tool 250 may be used to create a distance between seats 130 sufficient to allow installation of gate 120. Installation tool 250 comprises a rod 255 extending axially between arms 260. Arms 260 may comprise radially extending shoulder 270 with a surface 275 configured to provide flush engagement with surfaces 210 of seats 130. Rod 255 is of a sufficient length that seats 130 are separated by an axial distance D', which is greater than or equal to width A of gate 120. Again, because A≤D', gate 120 may be inserted between seats 130, as shown in FIG. 5B.

Figure 6:
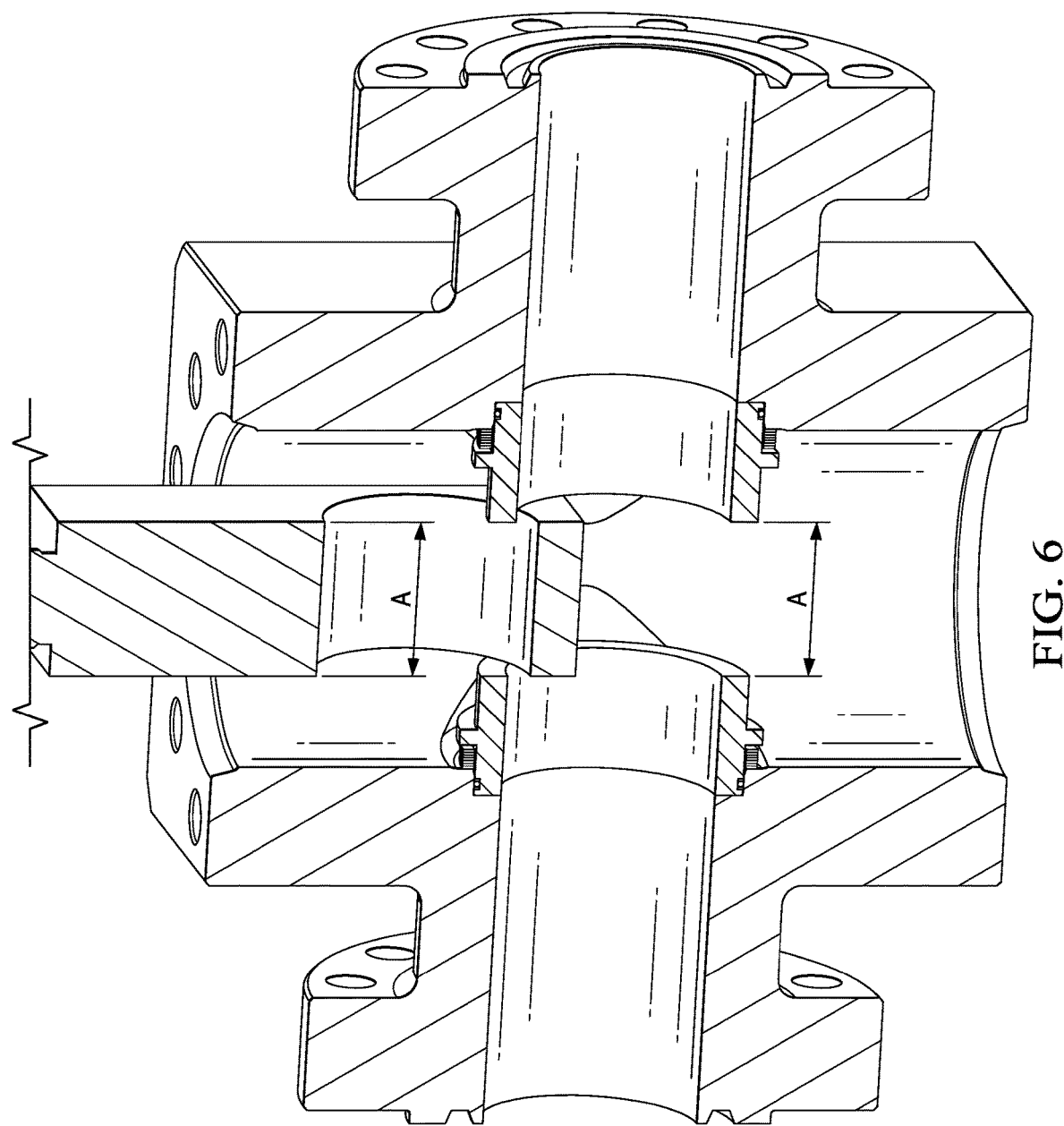
FIG. 6 depicts the embodiment shown in FIG. 1 once the installation tool has been removed.
Figure 7:
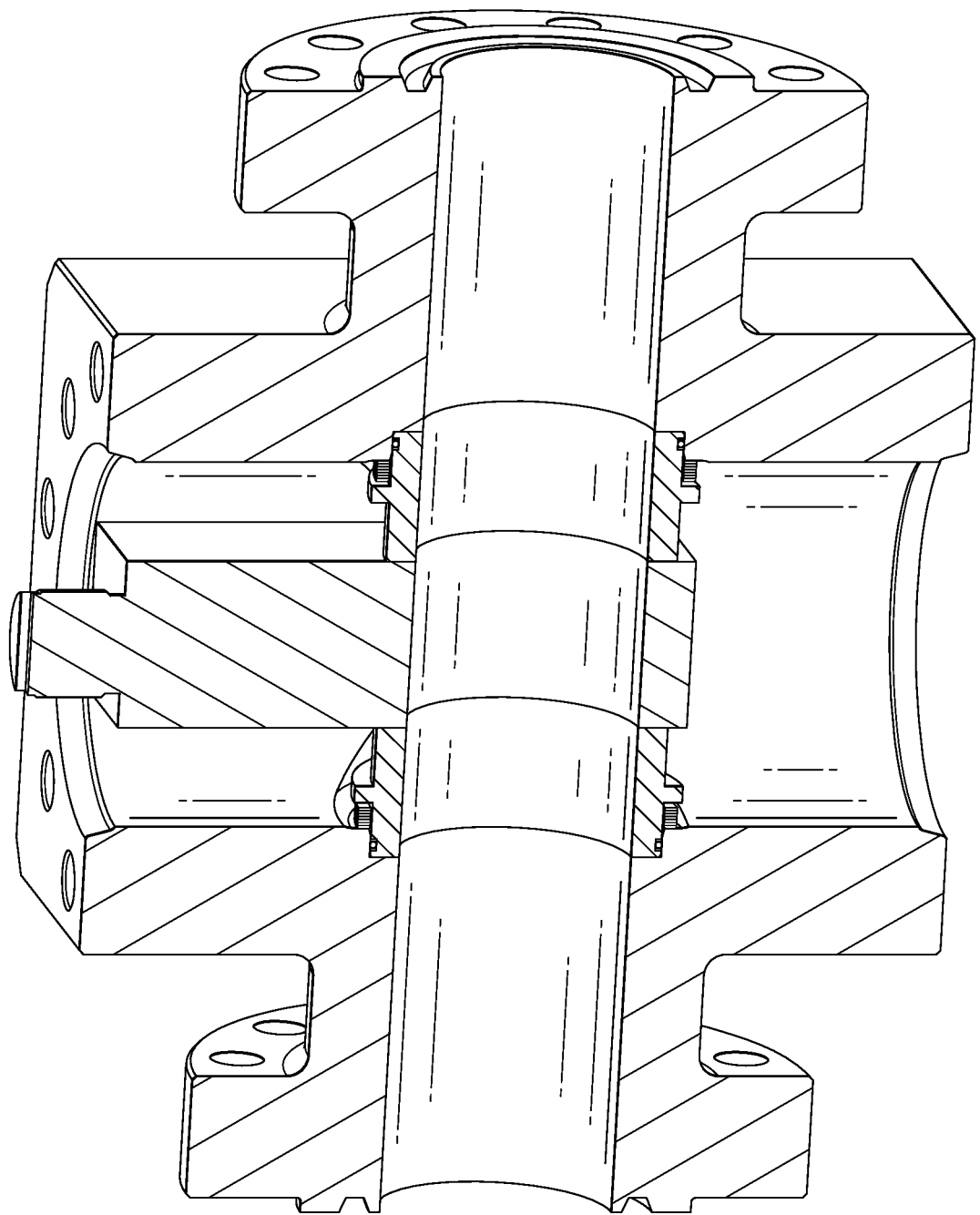
FIG. 7 depicts the embodiment shown in FIG. 1 after the flow barrier has been fully inserted between the valve seats.

For either of the foregoing embodiments, once gate 120 has been partially inserted between seats 130, installation tool 201 or 250 may be removed, as shown in FIG. 6. At that point, gate 120 will hold the seats 130 apart at a distance substantially equal to width A, so that gate 120 may be moved downward to the fully installed position, as shown in FIG. 7.

Figure 8A:
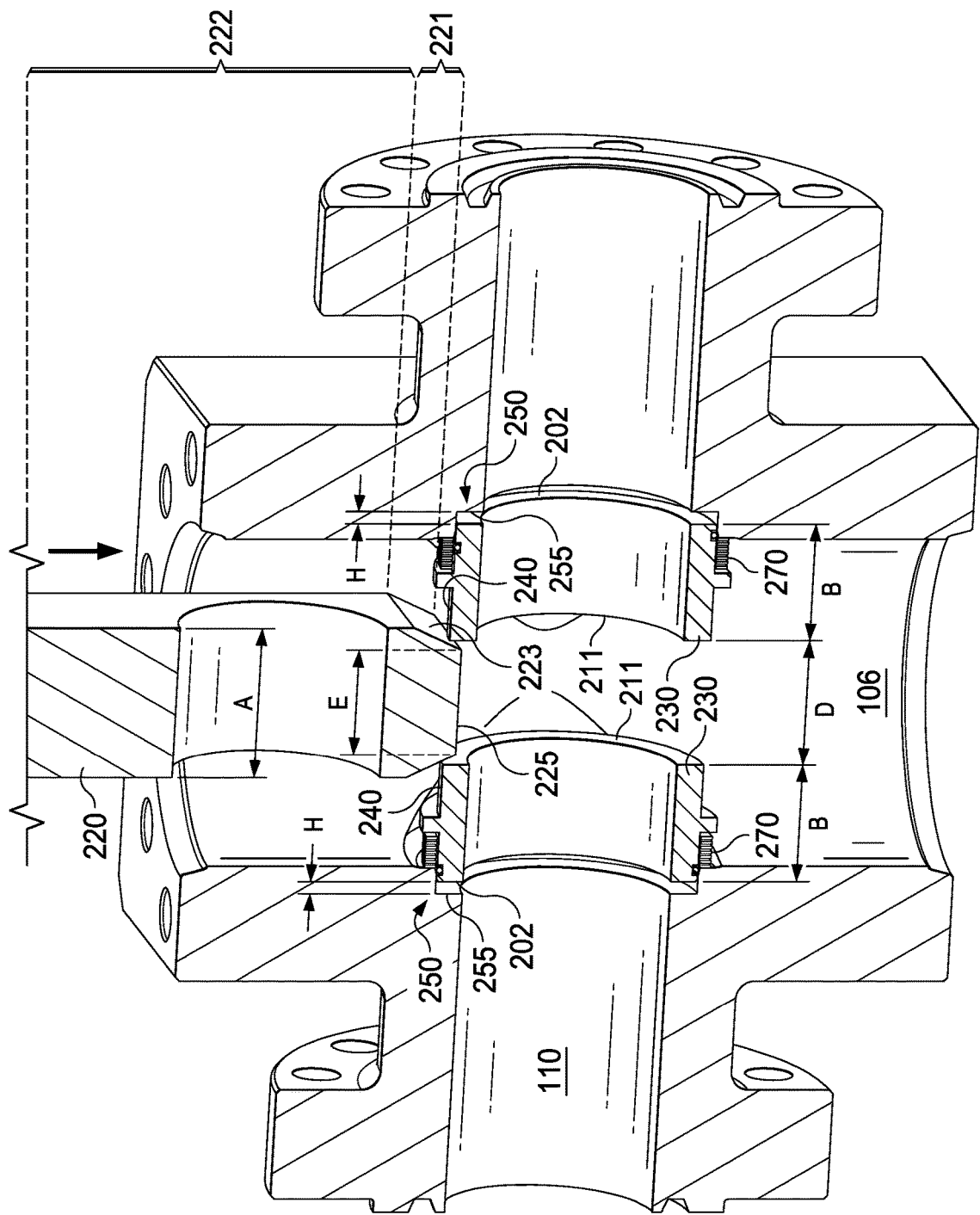
FIG. 8A depicts an alternate embodiment of the valve in which the flow barrier comprises a lower axial face that transitions to a beveled outer surface.

In an alternate embodiment, the configuration of the flow barrier may be modified to facilitate installation of valve seats with a biasing member. As shown in FIG. 8A, gate 220 may comprise a lower portion 221 and an upper portion 222 with width A. Lower portion 221 comprises lower axial face 225 and beveled surface 223. Lower axial face 225 has a width E, which is less than width A. Beveled surface 223 is adjacent to lower axial face 225 and angled such that the width of lower portion 221 is equal to width A at the point where lower portion 221 joins upper portion 222.

Figure 8B:
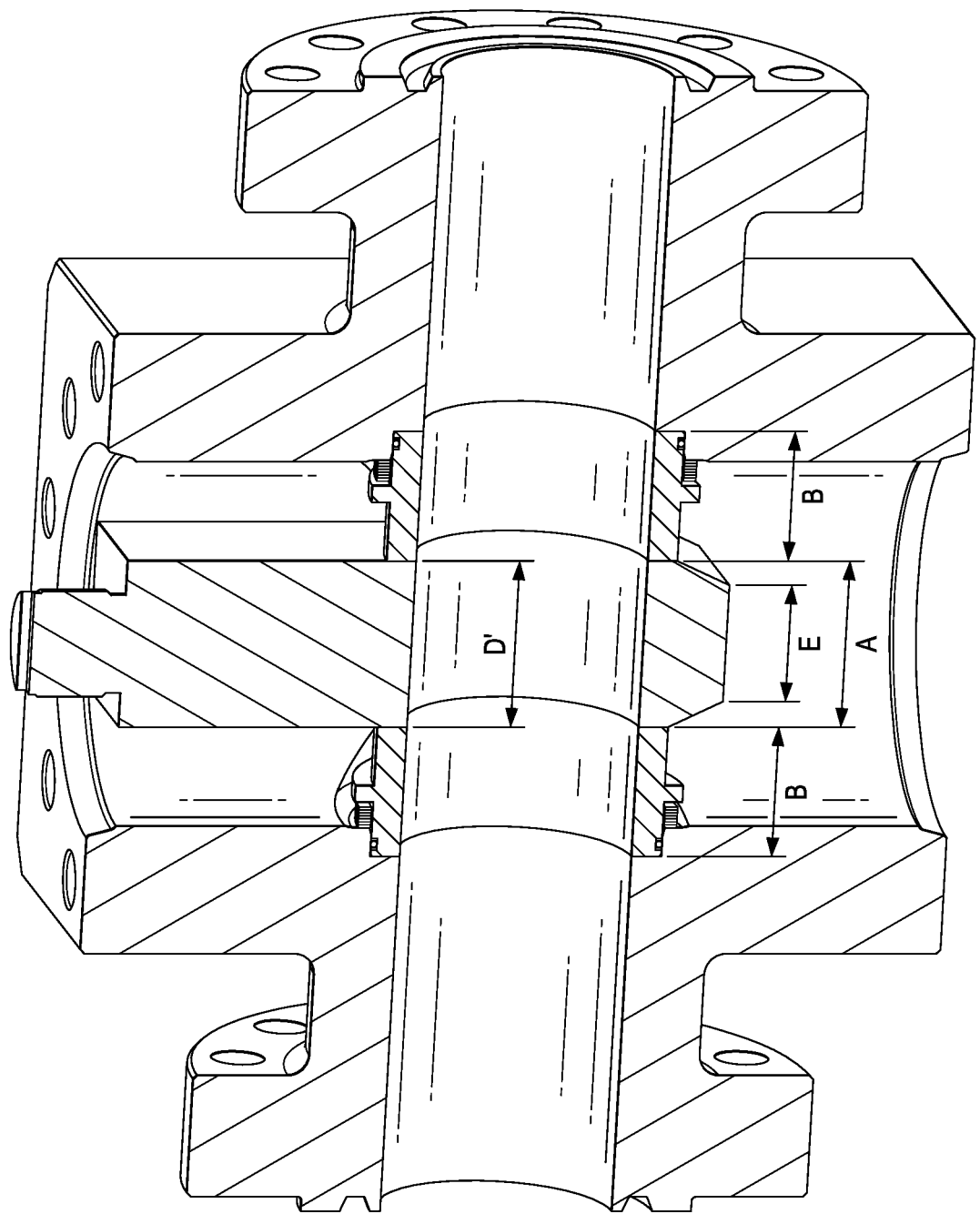
FIG. 8B depicts the embodiment shown in FIG. 8A after the flow barrier has been fully inserted between the valve seats.

In FIG. 8A, similar to FIG. 3, each seat 230 has width B and comprises radial surface 202 adjacent to valve body 20 and radial surface 211, which is adjacent to gate 220 after the valve has been assembled. When biasing members 270 are not compressed, radial surfaces 211 of seats 230 are spaced apart from each other by a distance D and radial surfaces 202 of seats 230 are spaced apart from radial surfaces 255 of recesses 250 by a gap of width H. Width E of lower axial face 225 of lower portion 221 of gate 220 is less than distance D. Accordingly, when gate 220 is moved down through cavity 106 during installation, lower axial face 225 is able to pass between upper axial surface 240 of seats 230, as shown in FIG. 8A. Subsequently, upper axial surface 240 will engage beveled surface 223 when the width of lower portion 221 is equal to distance D. At that point, continued downward movement of gate 220 will cause beveled surface 223 to exert axial force on seats 230. This will result in compression of biasing members 270 and further displacement of seats 230 into recesses 250. As beveled surface 223 continues to force seats 230 apart from each other, this compression and displacement will continue until upper portion 222 of gate 220 passes between seats 230. At that point, the distance D' separating seats 230 is substantially equal to width A of upper portion 222 of gate 220. Gate 220 will then hold the seats 230 apart at a distance substantially equal to width A, so that gate 220 may be moved downward to the fully installed position, as shown in FIG. 8B.

Figure 9A:
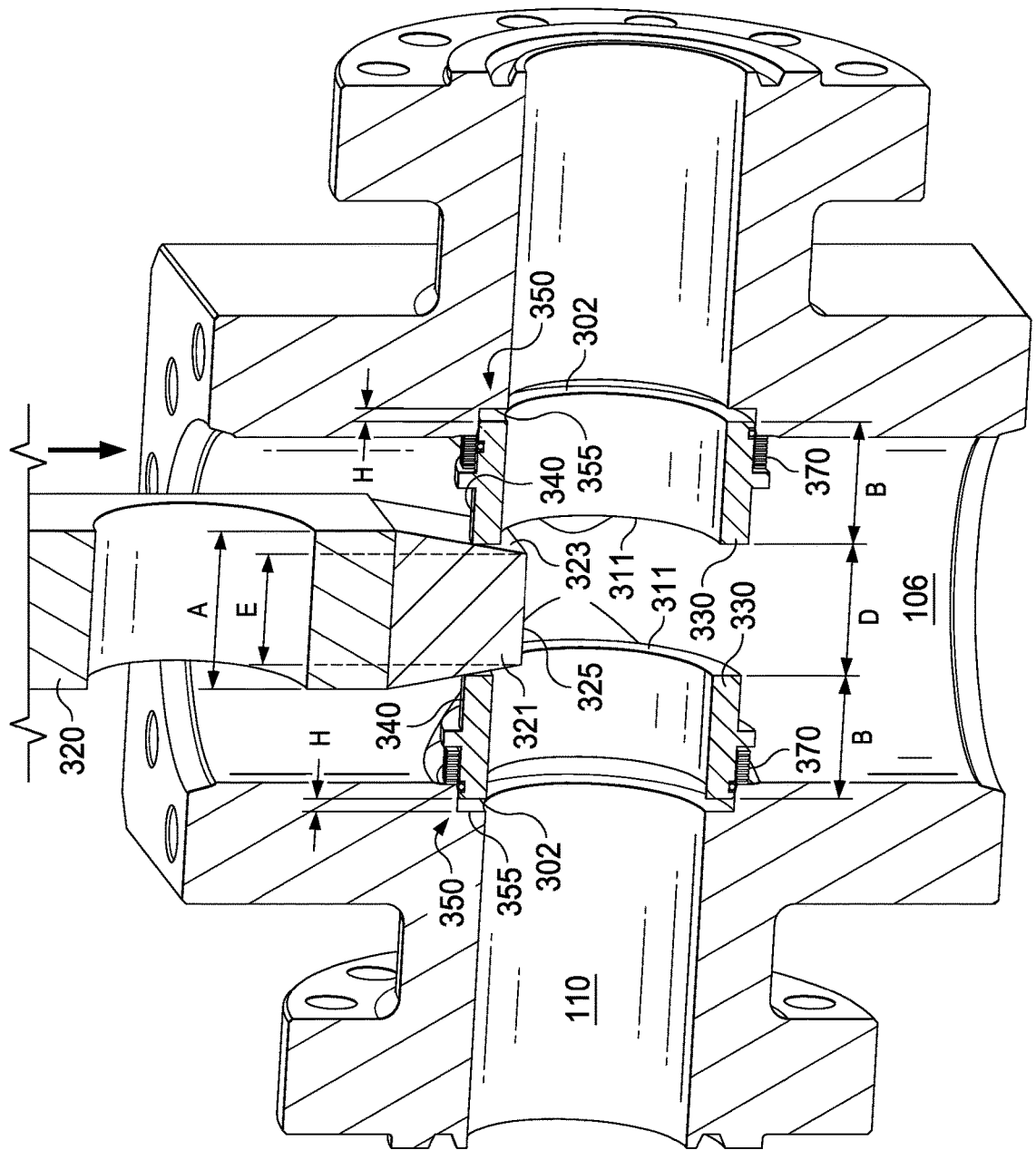
FIG. 9A depicts an alternate embodiment of the valve in which the flow barrier comprises a separate guide member connected to the lower face of the flow barrier.

In another alternate embodiment, as shown in FIG. 9A, gate 320 may have a substantially rectangular cross-section, such that it has a uniform width A. Attached to a lower face of gate 320 is guide member 321. Guide member 321 comprises lower axial face 325 and beveled surface 323. Lower axial face 325 has a width E, which is less than width A. Beveled surface 323 is adjacent to lower axial face 325 and angled such that the width of guide member 321 is equal to width A at the point where guide member 321 is attached to gate 322.

Figure 9B:
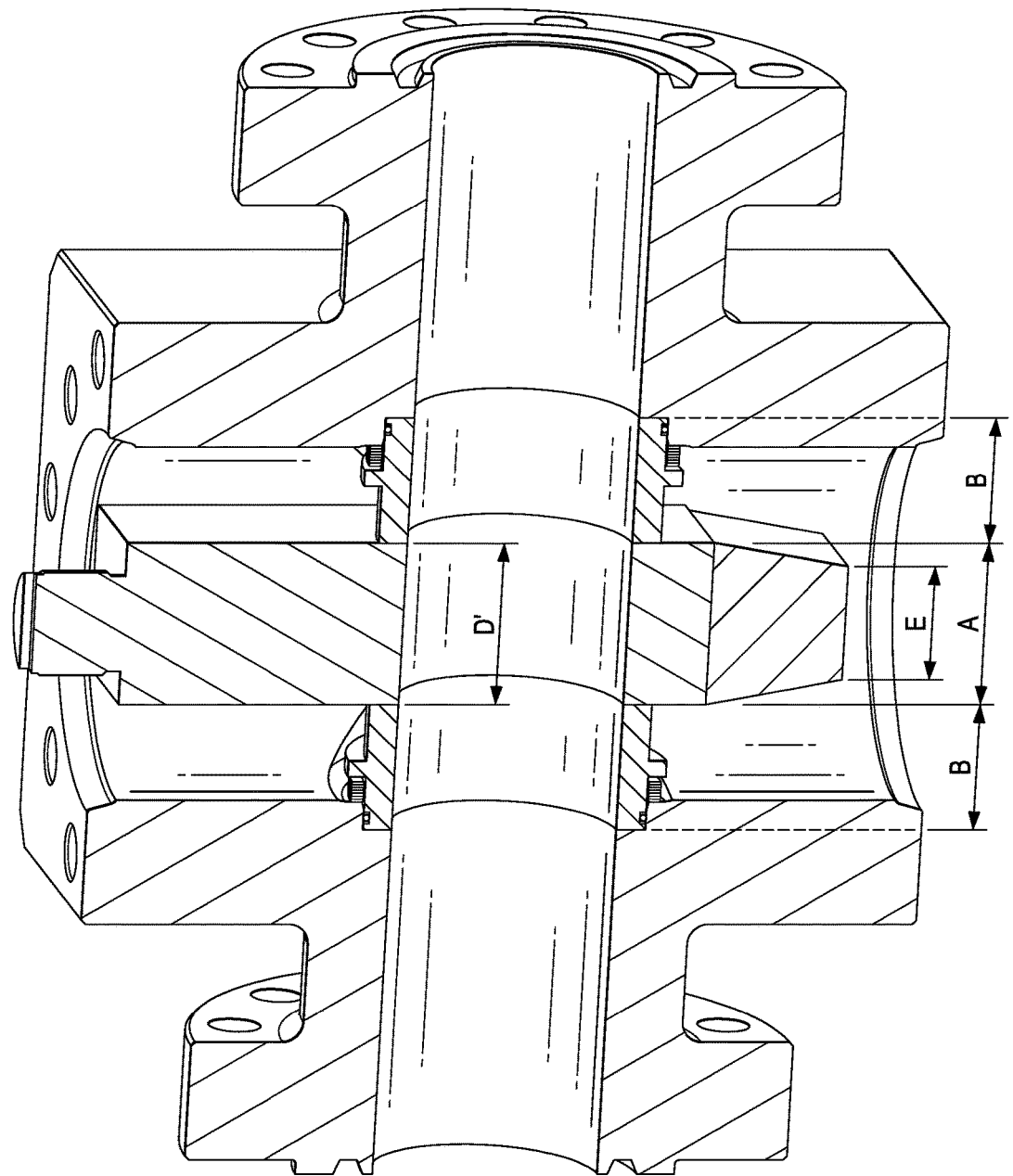
FIG. 9B depicts the embodiment shown in FIG. 9A after the flow barrier and guide member have been fully inserted between the valve seats.

In FIG. 9A, similar to FIG. 3, each seat 330 has width B and comprises radial surface 302 adjacent to valve body 20 and radial surface 311, which is adjacent to gate 320 after the valve has been assembled. When biasing members 370 are not compressed, radial surfaces 311 of seats 330 are spaced apart from each other by a distance D and radial surfaces 302 of seats 230 are spaced apart from radial surfaces 355 of recesses 350 by a gap of width H. Width E of lower axial face 325 of guide member 321 of gate 320 is less than distance D. Accordingly, when gate 320 and guide member 321 are moved down through cavity 106 during installation, lower axial face 325 of guide member 321 is able to pass between upper axial surface 340 of seats 330, as shown in FIG. 9A. Subsequently, upper axial surface 340 will engage beveled surface 323 when the width of guide member 321 is equal to distance D. At that point, continued downward movement of guide member 321 will cause beveled surface 323 to exert axial force on seats 330. This will result in compression of biasing members 370 and further displacement of seats 330 into recesses 350. As beveled surface 323 continues to force seats 330 apart from each other, this compression and displacement will continue until the gate 320 begins to pass between seats 330. At that point, the distance D' separating seats 330 is substantially equal to width A of gate 320. Gate 320 will then hold the seats 330 apart at a distance substantially equal to width A, so that gate 320 may be moved downward to the fully installed position, as shown in FIG. 9B.

Figure 10A:
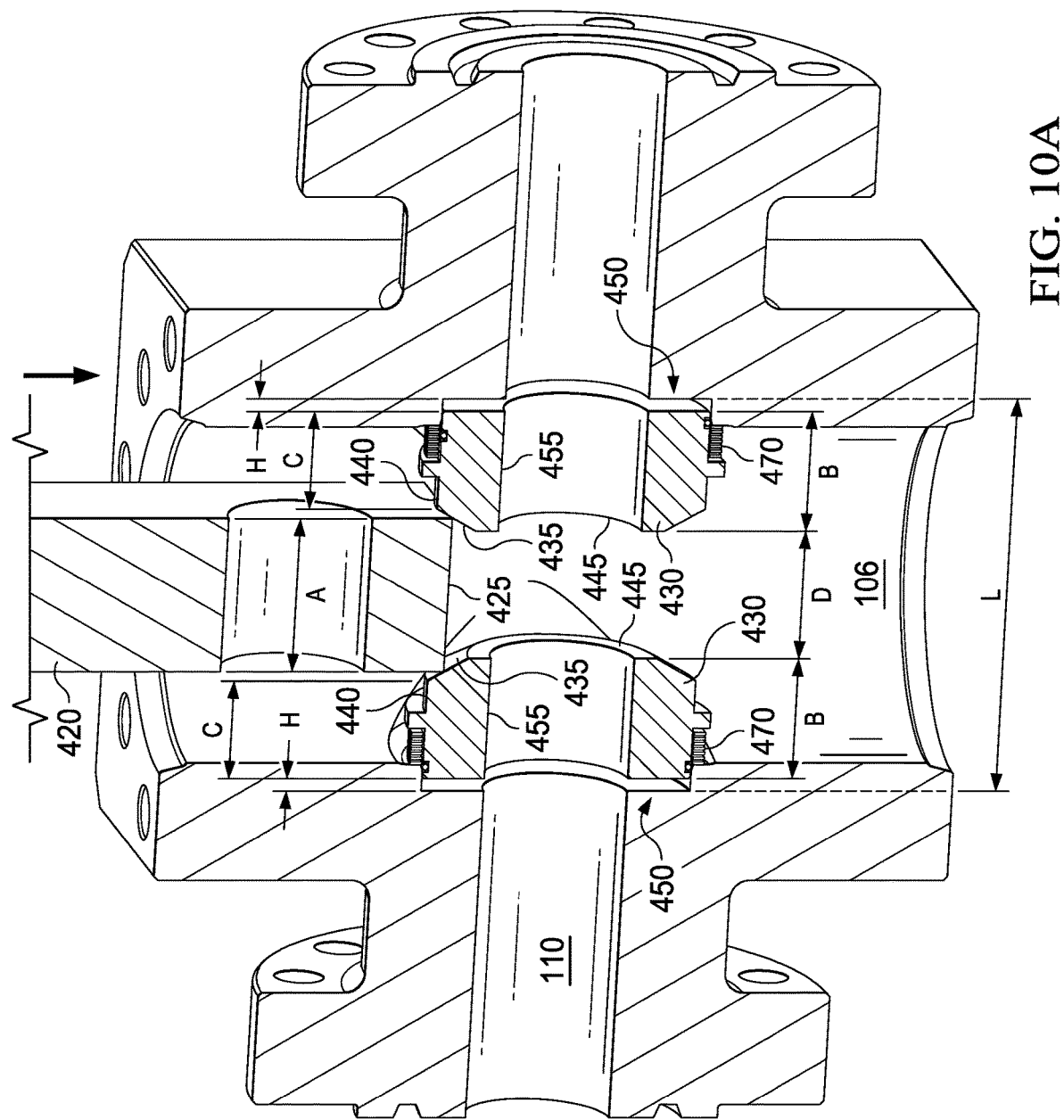
FIG. 10A depicts an alternate embodiment of the valve in which each seat comprises an upper axial face that transitions to a beveled outer surface.

In another alternate embodiment, the configuration of the valve seats may be modified to facilitate installation of the flow barrier. As shown in FIG. 10A, gate 420 may have a substantially rectangular cross-section, such that it has a uniform width A. Gate 420 comprises lower axial face 425.

Seats 430 may comprise upper axial face 440, beveled surface 435, radial surface 445, and lower axial face 455. Lower axial face 455 has width B. Upper axial face has width C, which is less than width B. Beveled surface 435 is adjacent to both upper axial face 440 and radial surface 445.

As shown in FIG. 10A, when biasing members 470 are not compressed, lower axial face 455 of both seats 430 will extend axially into cavity 106 by the width B+H. This configuration leaves the axial distance D between radial surfaces 445 of seats 430, where D=L−2(B+H). Upper axial faces 440 of seats 430, however, only extend axially into cavity 106 by the lesser width C+H. Seats 430 are configured such that the distance between upper axial faces 440 is greater than width A of gate 420 (A<L−2(C+H)).

Figure 10B:
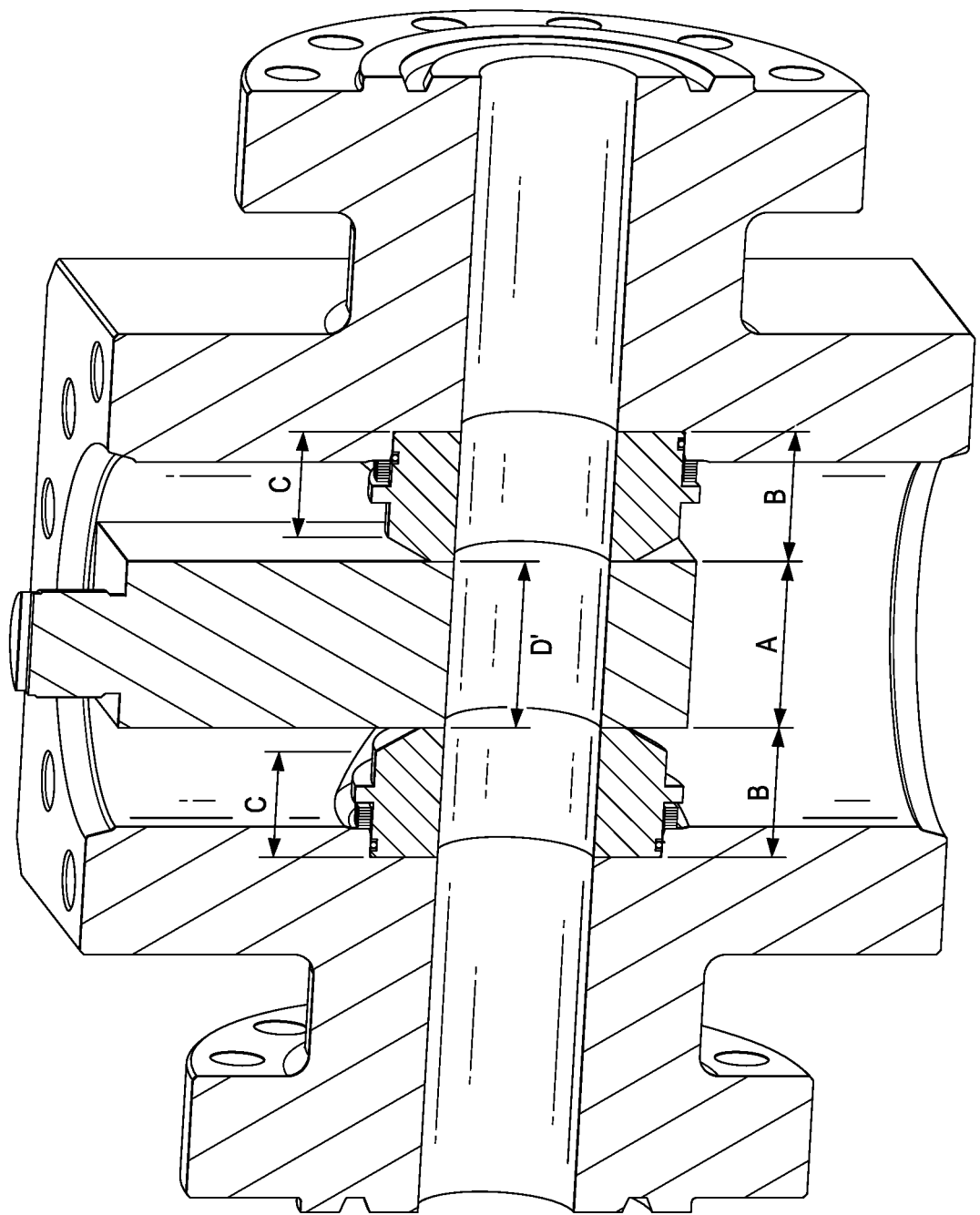
FIG. 10B depicts the embodiment shown in FIG. 10A after the flow barrier has been fully inserted between the valve seats.

Accordingly, when gate 420 is moved down through cavity 106 during installation, lower axial face 425 of gate 420 is able to pass between upper axial surface 440 of seats 430, as shown in FIG. 10A. Subsequently, lower axial face 425 will engage beveled surface 435 of seats 430 when the distance between seats 430 is equal to width A. At that point, continued downward movement of gate 420 will cause lower axial face 425 to exert axial force on beveled surface 435 of seats 430. This will result in compression of biasing members 470 and further displacement of seats 430 into recesses 450. As lower axial face 425 continues to force seats 430 apart from each other, this compression and displacement will continue until gate 420 has passed beveled surfaces 435 and engages radial surfaces 445. At that point, the distance D' separating seats 430 is substantially equal to width A of gate 420. Gate 420 will then hold the seats 430 apart at a distance substantially equal to width A, so that gate 420 may be moved downward to the fully installed position, as shown in FIG. 10B. In the fully installed position, radial surfaces 445 are capable of sealing engagement with gate 420.

Figure 11A:
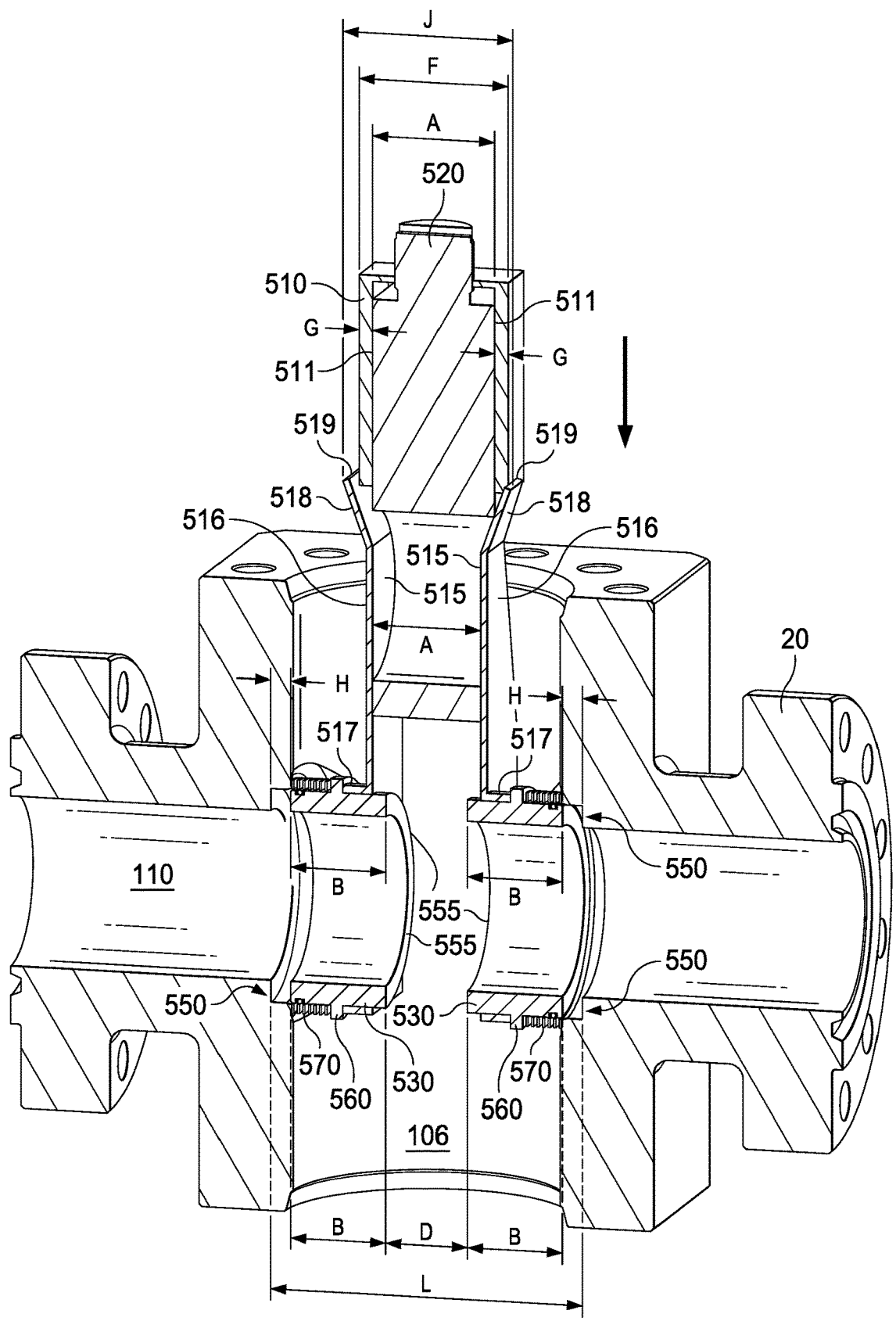
FIG. 11A depicts an alternate embodiment of the valve in which the flow barrier is installed using an outer sleeve and two compression members.

In another alternate embodiment shown in FIG. 11A, gate 520 may be installed using outer sleeve 510 and compression members 515. As in prior embodiments, gate 520 has width A. Seats 530 have width B and comprise support 560. Biasing members 570 are disposed between valve body 20 and supports 560. Accordingly, axial faces 555 of both seats 530 extend axially into cavity 106 by the width B+H. This configuration leaves the axial distance D between seats 530, where D=L−2(B+H). Also as in prior embodiments, width A is greater than distance D (A>D).

Outer sleeve 510 comprises two arms 511, each with width G, which slidingly engage the outer surface of gate 520. Accordingly, the combination of gate 520 and outer sleeve 510 has width F, where F=A+2(G).

Compression members 515 each comprise lower flange 517, substantially planar member 516, and upper flared portion 518. Upper ends 519 of upper flared portions 518 are separated by distance J, which is wide enough to allow outer sleeve 510 to pass between upper ends 519 (J>F). Upper flared portions 518 are angled inwardly, such that the initial distance between substantially planar members 516 is substantially equal to width A. Lower flanges 517 extend axially from substantially planar members 516, and are configured to engage radial supports 560 of seats 530.

Figure 11B:
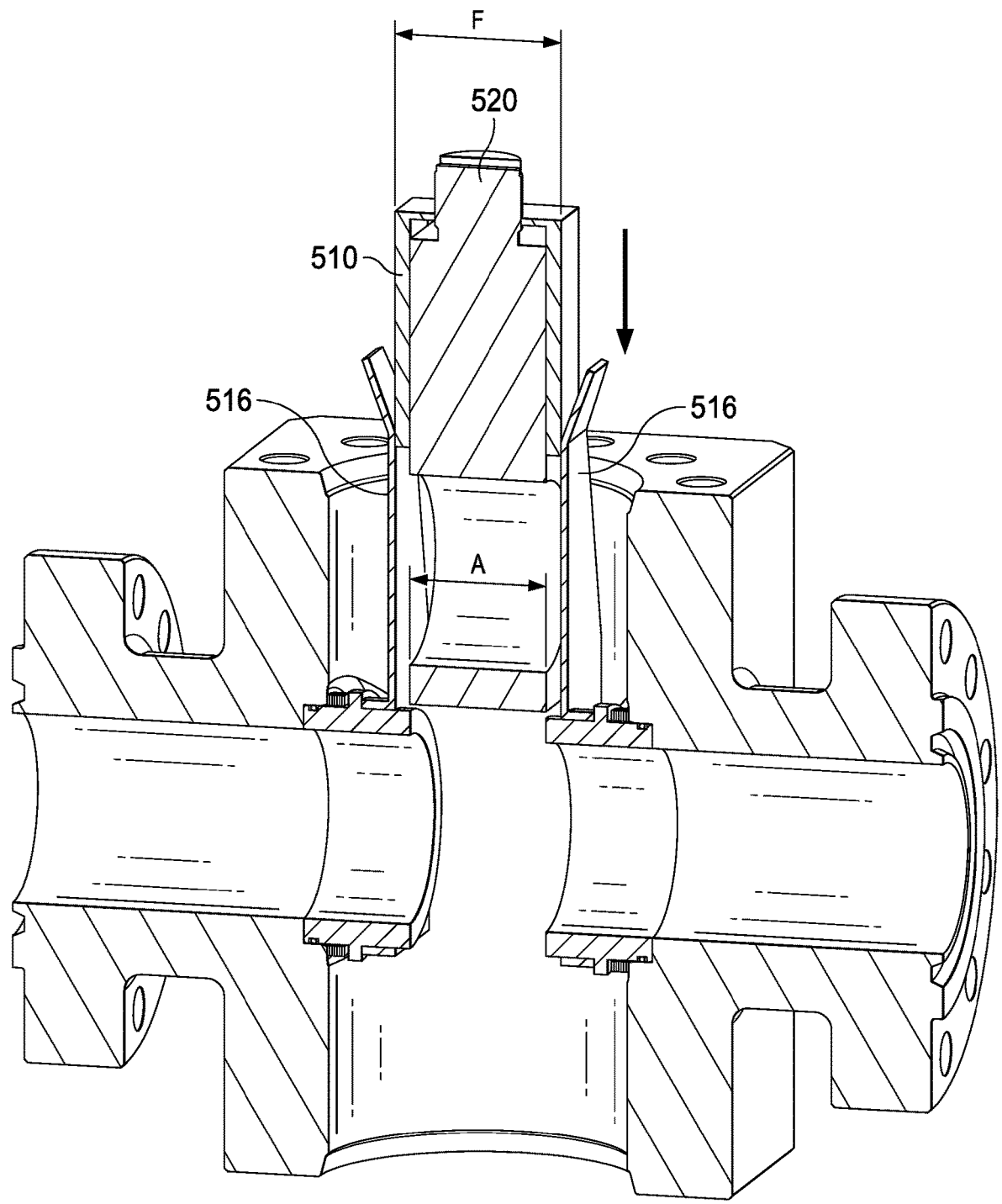
FIG. 11B depicts the embodiment shown in FIG. 11A after the outer sleeve has engaged the compression members.

During installation, gate 520 and outer sleeve 510 are both inserted between upper ends 519 of upper flared portion 518 of compression members 515. Subsequently, outer sleeve 510 will engage the inner surface of upper flared portions 518 when the distance between upper flared surfaces 518 is equal to width F. At that point, continued downward movement of gate 520 will cause outer sleeve 510 to exert axial force on compression members 515. Due to the engagement between lower flanges 517 and supports 560 of seats 530, this axial force will result in compression of biasing members 570 and further displacement of seats 530 into recesses 550. As shown in FIG. 11B, when outer sleeve 510 is between substantially planar members 516, the distance between those members is substantially equal to F and seats 530 have been fully displaced into recesses 550.

Figure 11C:
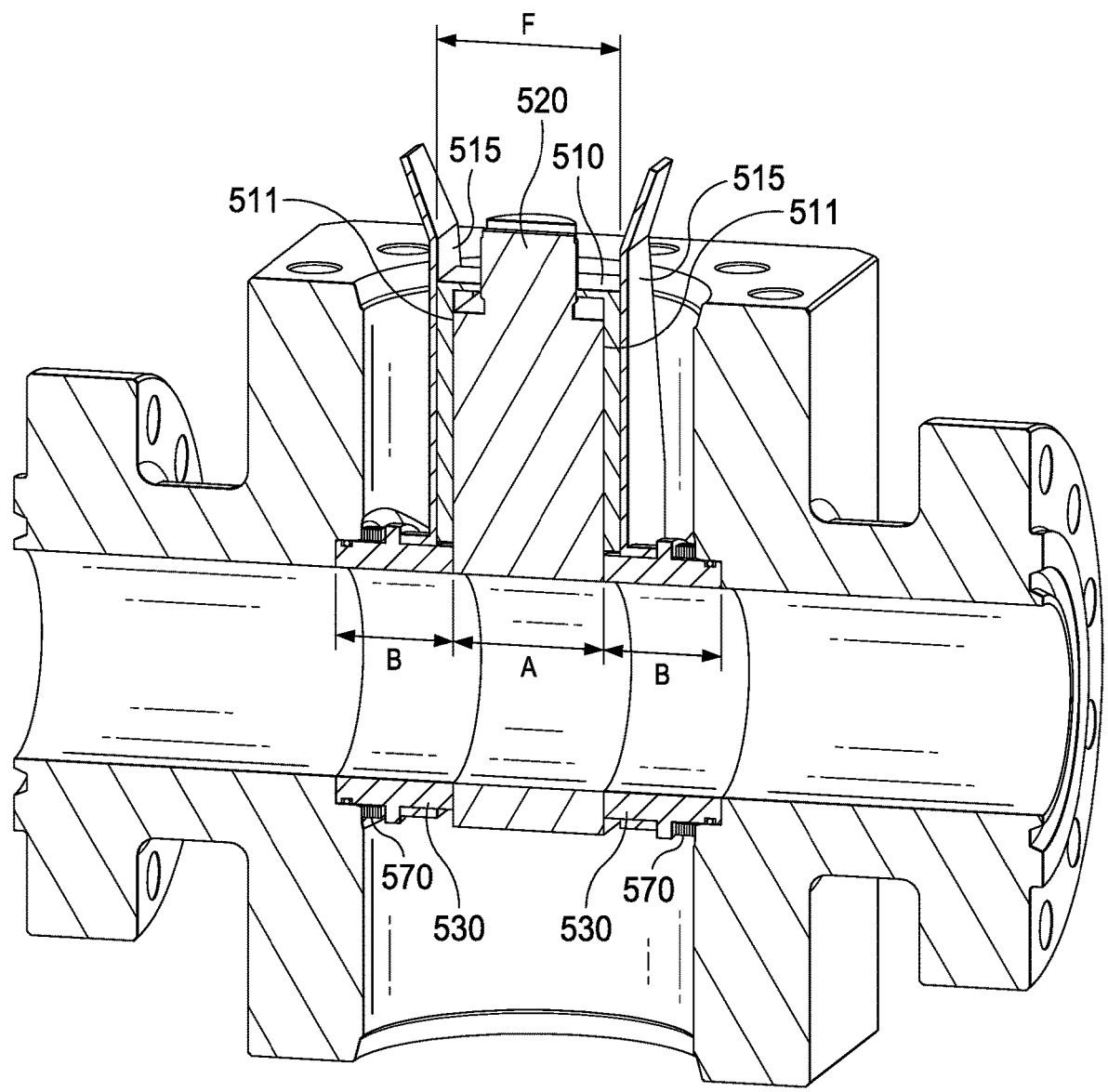
FIG. 11C depicts the embodiment shown in FIG. 11A after the flow barrier has been fully inserted between the valve seats.

Gate 520 is moved further downward until it reaches the position shown in FIG. 11C. Because arms 511 of outer sleeve 510 do not extend the entire length of gate 520, gate 520 may be inserted between seats 530. At that point, biasing members 570 are compressed and gate 520 is fully installed.

Figure 11D:
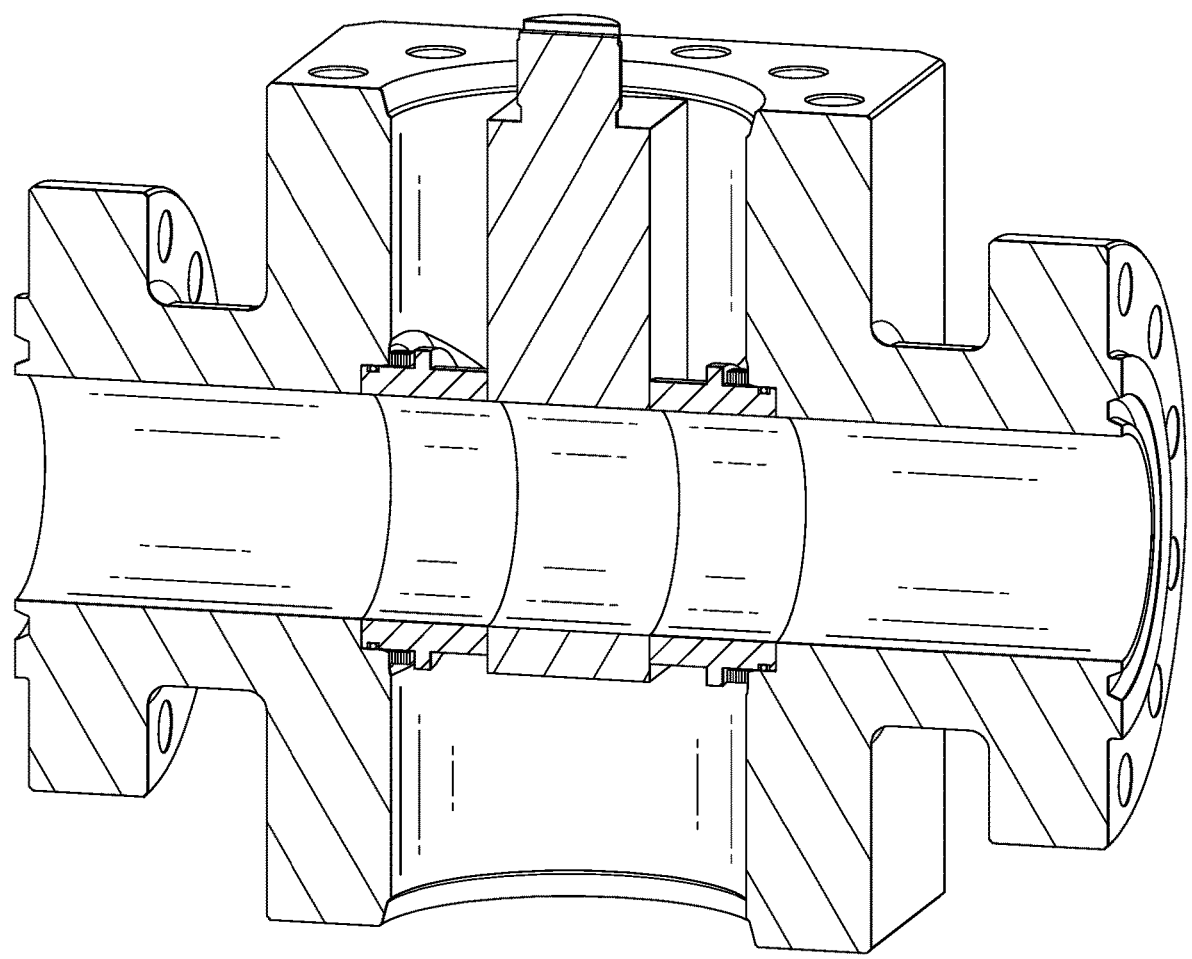
FIG. 11D depicts the embodiment shown in FIG. 11A after the outer sleeve and compression members have been removed.

As shown in FIG. 11D, outer sleeve 510 and compression members 515 are then removed and the valve is ready for use.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method of assembling a valve comprising:
   inserting into a cavity of a valve body two seats and two biasing members disposed between the valve body and the seats, such that the seats are separated by a first axial distance;
   inserting into the cavity of the valve body a flow barrier with a first width greater than the first axial distance;
   moving the seats axially apart from each other using an installation tool comprising two rods, each rod comprising a radially extending arm configured to engage one of the seats, such that the biasing members are compressed and the seats are separated by a second axial distance which is greater than or substantially equal to the width of the flow barrier; and
   moving the flow barrier to a position between the seats, such that the biasing members exert an axial force causing the seats to engage the flow barrier.

2. The method of claim 1, wherein the biasing members comprise springs.

3. The method of claim 1, wherein the seats further comprise radially extending supports and the biasing members are disposed between the supports and the valve body.

4. The method of claim 1, wherein the valve body comprises recesses and the step of moving the seats axially apart from each other comprises moving the seats into the recesses.

5. The method of claim 1, wherein each of the seats comprises a radially extending surface and the arm of each rod comprises a shoulder configured to engage one of the radially extending surfaces.

6. A valve assembly comprising:
   a valve body comprising a cavity;
   a plurality of seats disposed within the cavity, each seat comprising a radially extending surface;
   a flow barrier;
   a plurality of biasing members, each biasing member configured to exert an axial force on one of the seats;
   an installation tool comprising a plurality of rods, each rod comprising a radially extending arm configured to engage the radially extending surface of one of the seats.

7. The valve assembly of claim 6, wherein the biasing members comprise springs.

8. The valve assembly of claim 6, wherein the seats further comprise radially extending supports and the biasing members are disposed between the supports and the valve body.

9. The valve assembly of claim 6, wherein the valve body further comprises a plurality of recesses and each of the seats is configured to be slidably disposed within one of the plurality of recesses.

* * * * *